United States Patent
Albers et al.

(10) Patent No.: US 7,644,482 B2
(45) Date of Patent: Jan. 12, 2010

(54) PLANETARY GEAR REPLACEMENT METHOD

(75) Inventors: Helmut Albers, Holzwickede (DE);
Rainer Aust, Bochum (DE); Wolfhard Dombrowski, Bochum (DE); Ingo Kowalczik, Bochum (DE); Marc Neufelder, Witten (DE)

(73) Assignee: Eickhoff Maschinenfabrik GmbH, Bochum (DE)

( * ) Notice: Subject to any disclaimer, the term of this patent is extended or adjusted under 35 U.S.C. 154(b) by 855 days.

(21) Appl. No.: 11/322,191

(22) Filed: Dec. 29, 2005

(65) Prior Publication Data
US 2006/0148612 A1    Jul. 6, 2006

(30) Foreign Application Priority Data
Dec. 31, 2004    (EP)    ............................ 04031089

(51) Int. Cl.
*B21D 39/03*    (2006.01)
*B21D 53/28*    (2006.01)
*B23P 6/00*    (2006.01)
*F16H 57/08*    (2006.01)

(52) U.S. Cl. .................. 29/402.08; 29/402.01; 29/428; 29/893.1; 29/893.2; 475/331

(58) Field of Classification Search .............. 29/402.01, 29/402.08, 428, 893.1, 893.2; 475/331
See application file for complete search history.

(56) References Cited

U.S. PATENT DOCUMENTS

| 4,008,629 A | * | 2/1977 | Hoepfl et al. ............... 475/331 |
| 4,759,229 A | | 7/1988 | Takahashi et al. |
| 4,944,195 A | | 7/1990 | Takahashi et al. |

FOREIGN PATENT DOCUMENTS

| DE | 37 11 405 | 3/1988 |
| DE | 199 55 516 | 12/2001 |
| DE | 101 59 973 | 6/2003 |
| GB | 267733 | 3/1927 |

* cited by examiner

*Primary Examiner*—David P Bryant
*Assistant Examiner*—Alexander P Taousakis
(74) *Attorney, Agent, or Firm*—Collard & Roe, P.C.

(57) ABSTRACT

A method permits replacement of components of existing epicyclic gear mechanisms of a wind energy system without having to lift the gear mechanism down from the gondola. In accordance with the method, the housing is divided up alternately in its first parting plane and in its second parting plane and moved apart. The center section of the housing, which includes the internal geared wheel, always remains connected with an adjacent section and therefore does not have to be moved with a hoist. Access to the components to be replaced is always guaranteed by the special method of opening. An installation bolt is also provided that is particularly suitable for implementing the method.

3 Claims, 16 Drawing Sheets

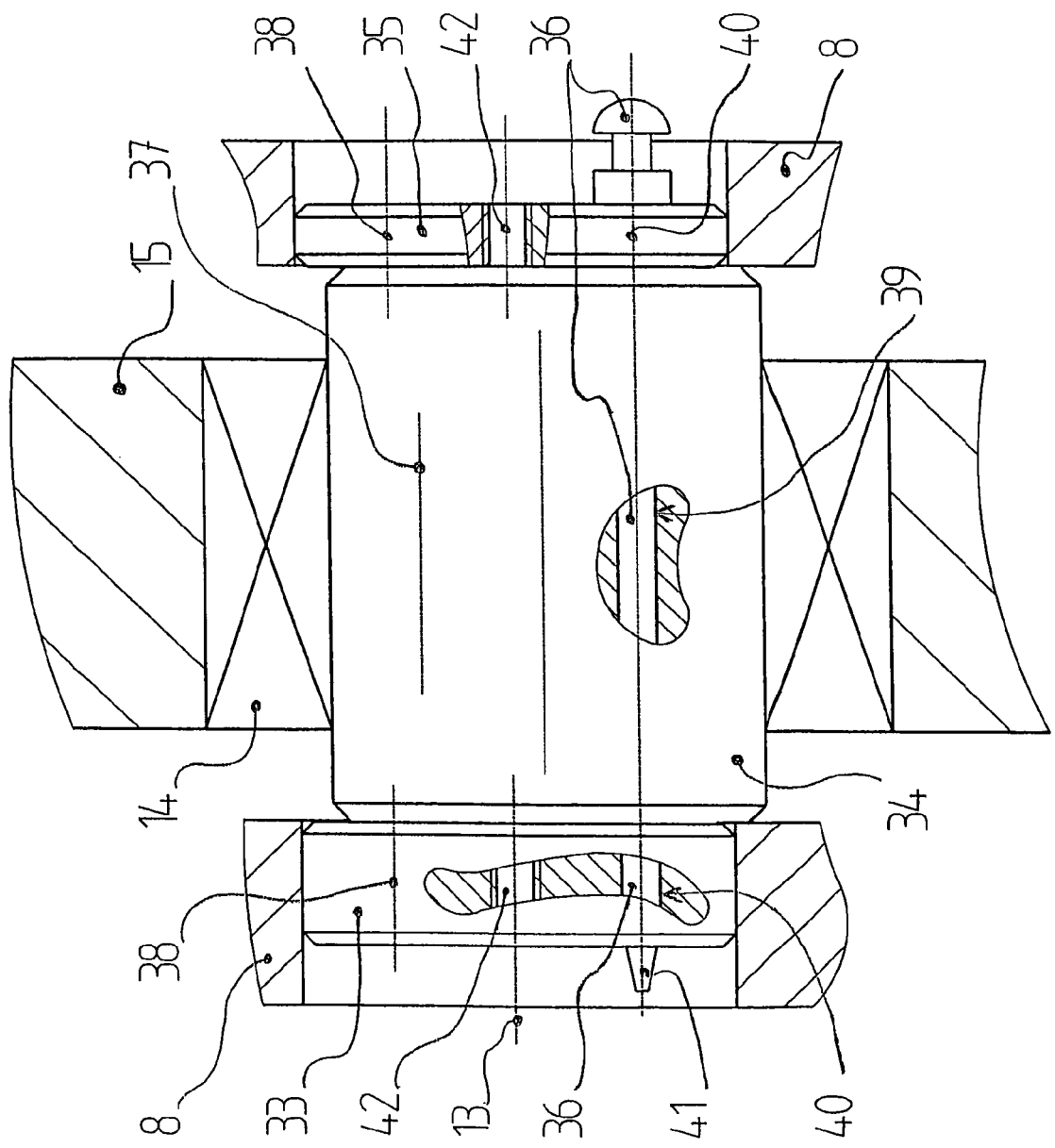

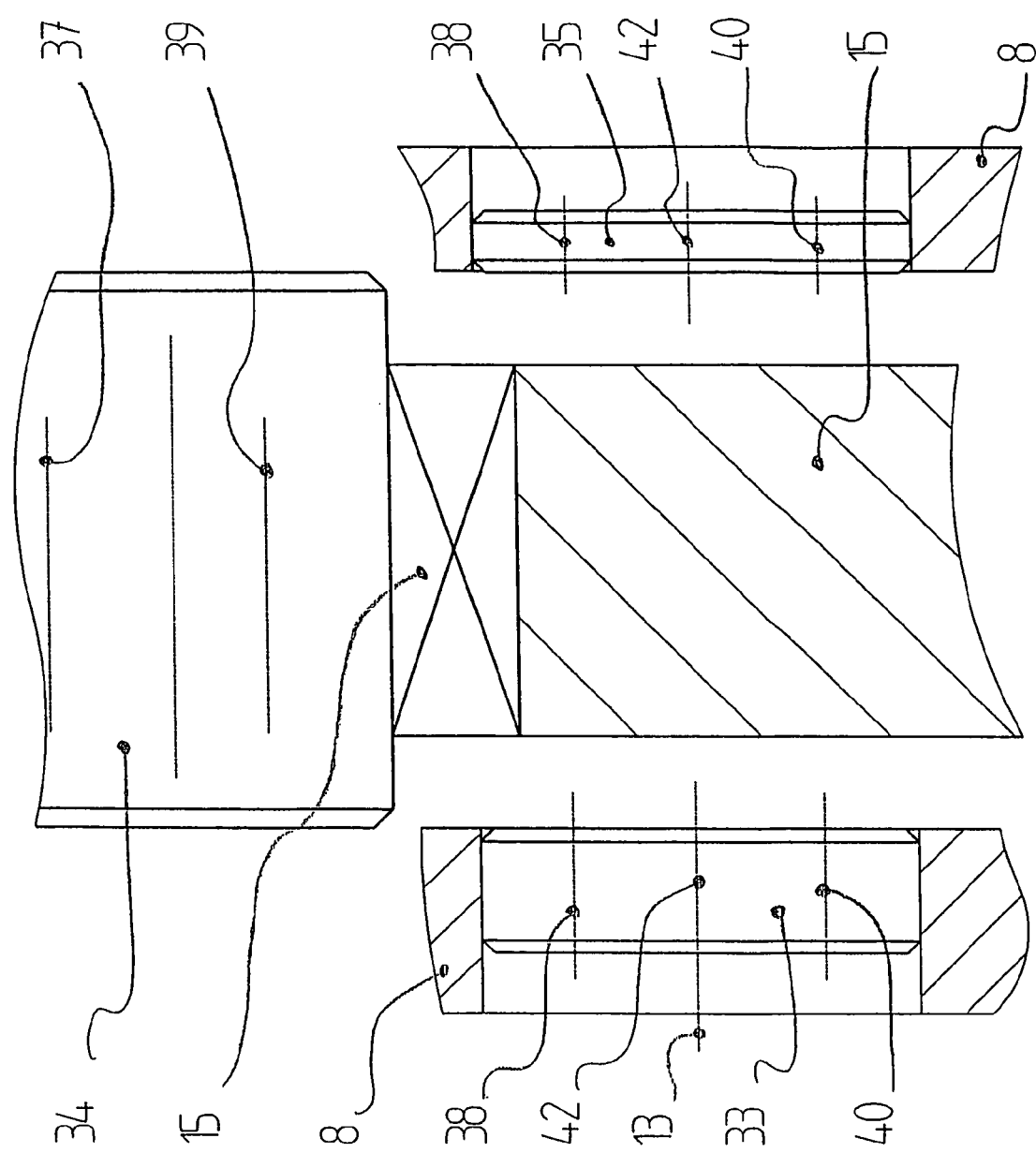

PLANETARY GEAR REPLACEMENT METHOD

CROSS REFERENCE TO RELATED APPLICATIONS

Applicants claim priority under 35 U.S.C. § 119 of European Application No. 04 031 089.8 filed on Dec. 31, 2004.

BACKGROUND OF THE INVENTION

1. Field of the Invention

The present invention relates to a method for replacing components of an epicyclic gear mechanism that is used particularly in a wind energy system. The epicyclic gear mechanism has a main axis; a housing that is divided by two parting planes into a drive side section, a center section, and a power take-off side section, whereby the three sections of the housing are lined up along the main axis, and whereby the housing can be separated in the parting planes; a pinion cage, which is mounted to rotate about the main axis in the drive side section of the housing and which has at least one planet bolt that extends along a planet axis that is fixed relative to the pinion cage and runs parallel to the main axis; an internal geared wheel that is disposed in the center section of the housing coaxially to the main axis, fixed on the housing; a sun wheel that is mounted to rotate about the main axis on the power take-off side section of the housing; and at least one planet wheel mounted to rotate on the planet bolt of the pinion cage and meshes both with the internal geared wheel in a first gear tooth engagement and with the sun wheel in a second gear tooth engagement; wherein the drive side section of the housing is mounted in a machine frame. Furthermore, the invention relates to an installation bolt that is particularly suitable for carrying out the method.

2. The Prior Art

Epicyclic gear mechanisms—also called planetary gear mechanisms—having these characteristics have been the state of the art for decades. They have also been used in wind energy systems for quite some time, in order to translate the comparatively low speed of rotation of the rotor into a higher speed of rotation suitable for the generator.

A gear mechanism for a wind energy system, of the type stated initially, is known from DE 101 59 973 A1. The planetary stage of this previously known gear mechanism is followed by an additional spur wheel stage having standing wheels. This arrangement is a common gear mechanism concept in the wind energy sector, because wind energy gear mechanisms must perform translations of up to 90, and this performance is sometimes difficult to implement with a single planetary stage, given the limited construction space in the gondola. A particular feature of the gear mechanism known from DE 101 59 973 A1 is the mounting of the sun shaft. The sun shaft is implemented as a toothed pinion shaft, which means that the sun wheel and the sun shaft form a common element of the gear mechanism. The sun shaft is provided with an axial bore, through which a shaft connected with the pinion cage is inserted along the main axis. In this manner, the sun wheel of the previously known gear mechanism is mounted to rotate in the housing.

In the region of the planetary stage, the housing of the previously known gear mechanism has two parting planes passing through it, which extend normal to the main axis, and divide the gear mechanism housing into three sections. These sections are a drive-like section in the direction of the rotor, a center section that is formed by the internal geared wheel fixed in the housing, and a power take-off section in the direction of the generator. By loosening the bolts that connect the internal geared wheel with the two adjacent sections of the housing, the previously known gear mechanism can be divided in both parting planes. The parting planes therefore run through the axial side surfaces of the internal geared wheel that is fixed in the housing.

In recent times, damage to wind energy systems has become known with remarkable frequency, which is possibly attributable to uncertainties in the dimensions and/or method of operation. The damage relates to the gear mechanisms, among other things, which are fixed in place between rotor and generator, as the core piece of the drive train. Therefore, the gear mechanisms are exposed to negative influences on all sides. The consequences are premature fatigue or even total failure of individual components of the gear mechanism such as wheels and bearings.

These cases of damage can be countered by replacement of components of the gear mechanism that are particularly at risk of failure. Instead of the components originally used, modified replacement components are used, in the dimensioning of which experience from the past is taken into consideration. Furthermore, it is possible to perform preventive maintenance measures in order to retain the system value and fulfill requirements resulting from insurance contracts. All of these measures are supposed to take place inexpensively.

However, the replacement of individual components of a wind energy gear mechanism because of its exposed position involves difficulties that increase costs. Thus, replacement of a planet wheel has required bringing the gear mechanism to the workshop, which in turn requires the gear mechanism to be disassembled and subsequently re-assembled. For this purpose, the system has to be shut down for weeks, in some cases, and an external mobile crane has to be procured, with which the gear mechanism removed from the drive train must be lifted from the tower. In some systems, the rotor also has to be taken off, since it is partially mounted in the gear mechanism. The resulting repair costs reach dimensions that make the replacement of components that are at risk of damage or have already been damaged appear uneconomical, in light of the low earnings of a wind energy system.

DE 199 55 516 C1 proposes a wind energy system that has a particularly strong on-board crane for lifting, for one thing, and has a large-area opening in the floor of the gondola, for another. Both these features make it possible to lower heavy and bulky units of the drive train, such as the gear mechanism, from the tower without using an external mobile crane, and subsequently pull them up again. Such wind energy systems have not become widespread to any noteworthy extent up to now. Instead, in most cases, older systems have to be repaired, which do not have a sufficiently powerful on-board crane and whose opening in the gondola floor measures at most a square meter, which is by far not enough to pass the gear mechanism through.

SUMMARY OF THE INVENTION

It is an object of the present invention, therefore, to provide a method that makes it possible to replace components of wind energy systems in the gondola. In this way, cost-intensive disassembly and workshop stays of the gear mechanism can be avoided.

These and other objects are accomplished, according to the invention, by a method for replacing components of an epicyclic gear mechanism that is particularly being used in a wind energy system, whereby the epicyclic gear mechanism has the following characteristics:

aa) a main axis;

ab) a housing that is divided by two parting planes into a drive side section, a center section, and a power take-off side section, whereby the three sections of the housing are lined up along the main axis, and whereby the housing can be separated in the parting planes;

ac) a pinion cage mounted to rotate about the main axis in the drive side section of the housing, and which has at least one planet bolt that extends along a planet axis that is fixed relative to the pinion cage and runs parallel to the main axis;

ad) an internal geared which that is disposed in the center section of the housing coaxially to the main axis, fixed on the housing;

ae) a sun wheel that is mounted to rotate about the main axis on the power take-off side section of the housing;

af) at least one planet wheel that is mounted to rotate on the planet bolt of the pinion cage and meshes both with the internal geared wheel in a first gear tooth engagement and with the sun wheel in a second gear tooth engagement;

ag) wherein the drive side section of the housing is mounted in a machine frame;

and whereby the method has the following steps:

ba) dividing the housing up in the parting plane between center section and power take-off side section;

bb) moving apart center section and power take-off side section so that the second gear tooth engagement between planet wheel and sun wheel is released;

bc) removing the sun wheel from the housing;

bd) parallel displacement of the planet wheel in such a manner that the first gear tooth engagement between planet wheel and internal geared wheel is released;

be) joining together center section and power take-off side section;

bf) separating the housing in the parting plane between drive side section and center section;

bg) moving apart drive side section and center section;

bh) removing the planet wheel;

bi) inserting a replacement planet wheel, off-set parallel to the planet axis;

bj) joining together drive side section and center section;

bk) separating the housing in the parting plane between power take-off side section and center section;

bl) moving apart power take-off side section and center section;

bm) restoring the first gear tooth engagement between internal geared wheel and replacement planet wheel by means of parallel displacement of the replacement planet wheel coaxially to the planet axis;

bn) inserting a replacement sun wheel in the housing; and bo) joining together the center section and the power take-off side section so that the second gear tooth engagement between the replacement planet wheel and the replacement sun wheel is restored.

The method according to the invention is based on the fundamental idea of dividing the gear mechanism alternately in one of the two parting planes, in order to easily access the components to be replaced. The center section of the housing is always connected with at least one of the two outer sections, and therefore does not have to be carried by a hoist. Implementation of the method presupposes that the power take-off side section is movable relative to the machine frame and the drive side section mounted in it. After the generator side section of the power train has been severed, and the housing has been divided in a parting plane, the power take-off side section is so movable. So that the power take-off side section of the gear mechanism does not fall down onto the machine frame, it is necessary, in some systems, to hold the power take-off side section with a suitable holding device. Under some circumstances, the on-board cranes installed in many gondolas are suitable as a holding device.

The method proposed makes it possible to replace the components of wind energy gear mechanisms that are relatively easy to transport, without having to lift the heavy and bulky housing parts from the tower for this purpose. In this regard, the present method is also not dependent on the large-area opening in the floor of the gondola described in DE 199 55 516 C1.

On-board cranes whose carrying capacity is sufficient to carry out the present method are not installed in all wind energy systems. Also, the planet gears of gear mechanisms in the higher performance class reach weights of about 500 kg, so that they can no longer be held by the installers with the required safety and accuracy. In such wind energy systems, it is practical to implement the method using a linear guide that is affixed between the power take-off section of the housing and the machine frame and extends parallel to the main axis. Using the linear guide the power take-off side section can be moved along the main axis relative to the machine frame when the housing is divided. It is true that this linear guide has to be heaved to the gondola especially for this purpose, but it allows rather uncomplicated and quick handling of the divided housing sections. These sections are guided along the main axis, and therefore always remain aligned. An on-board crane that is possibly present on the gondola remains free when the linear guide is used, and can be used for lifting and positioning the components to be replaced.

The method is preferably carried out using an installation bolt that has a bearing piece assigned to the planet wheel on which the planet wheel can be mounted and at least one cheek piece that is assigned to the pinion cage, which can be fixed in place on the pinion cage; wherein the bearing piece and the cheek piece are two separate components; the cheek piece has at least one axial cheek-alignment bore and at least one axial cheek eccentric bore; the bearing piece has at least one axial alignment bore and at least one axial alignment bore and at least one axial bearing eccentric bore; and the installation bolt includes at least one pin that can be inserted through the bores; whereby the cheek piece and the bearing piece align with one another when the pin is inserted through the cheek alignment bore and the bearing alignment bore at the same time; and whereby the cheek piece and the bearing piece are oriented eccentric to one another when the pin is inserted through the cheek eccentric bore and the bearing eccentric bore at the same time. This installation bolt is temporarily inserted into the pinion cage, in place of the planet bolt. The installation bolt is also suitable for use in pinion cages in which the planet bolts are supported on both sides and therefore can be removed only in the radial direction. Fundamentally, this installation bolt can also be used outside of the method described, on gear mechanisms with or without epicyclic wheels.

It is practical if the installation bolt is developed further with a threaded bore on a face of the bearing piece and/or the cheek piece. An eye screw can temporarily be screwed into such a threaded bore, facilitating the handling of the installation bolt.

If the planet bolt is supported in the pinion cage on both sides, it is practical to provide a second cheek piece.

The second cheek piece can have a lesser axial thickness than the first, in order to save weight, since it is primarily needed to center the wheel and does not have to absorb any great forces.

The pin is preferably provided with a wedge surface on the end, so that it can be introduced into the bores more easily.

BRIEF DESCRIPTION OF THE DRAWINGS

Other objects and features of the present invention will become apparent from the following detailed description considered in connection with the accompanying drawings. It should be understood, however, that the drawings are designed for the purpose of illustration only and not as a definition of the limits of the invention.

In the drawings, the drive train of a wind energy system, including the gear mechanism, is shown schematically.

In the drawings, wherein similar reference characters denote similar elements throughout the several views:

FIG. 1 is an overview of a prior art gear mechanism;

FIGS. 2a-2m show a method according to an embodiment of the invention;

FIGS. 3a-3j show partial steps of the method, using an embodiment of an installation bolt according to the invention;

FIG. 4a shows an installation bolt, in an aligned position;

FIG. 4b shows an installation bolt, in an eccentric position; and

FIG. 4c shows an installation bolt, divided.

DETAILED DESCRIPTION OF PREFERRED EMBODIMENTS

The following table indicates the figures in which the individual method steps are shown.

TABLE 1

(linking of the characteristics in the Summary of the Invention with the figures)

| Characteristic | FIG. |
|---|---|
| 1 aa | 1 |
| 1 ab | 1 |
| 1 ac | 1 |
| 1 ad | 1 |
| 1 ae | 1 |
| 1 af | 1 |
| 1 ag | 1 |
| 1 ba | — |
| 1 bb | 2 b |
| 1 bc | 2 c |
| 1 bd | 2 d |
| 1 be | 2 e |
| 1 bf | — |
| 1 bg | 2 f |
| 1 bh | 2 g |
| 1 bi | 2 h |
| 1 bj | 2 i |
| 1 bk | — |
| 1 bl | 2 j |
| 1 bm | 2 k |
| 1 bn | 2 l |
| 1 bo | 2 m |

Figure 1:
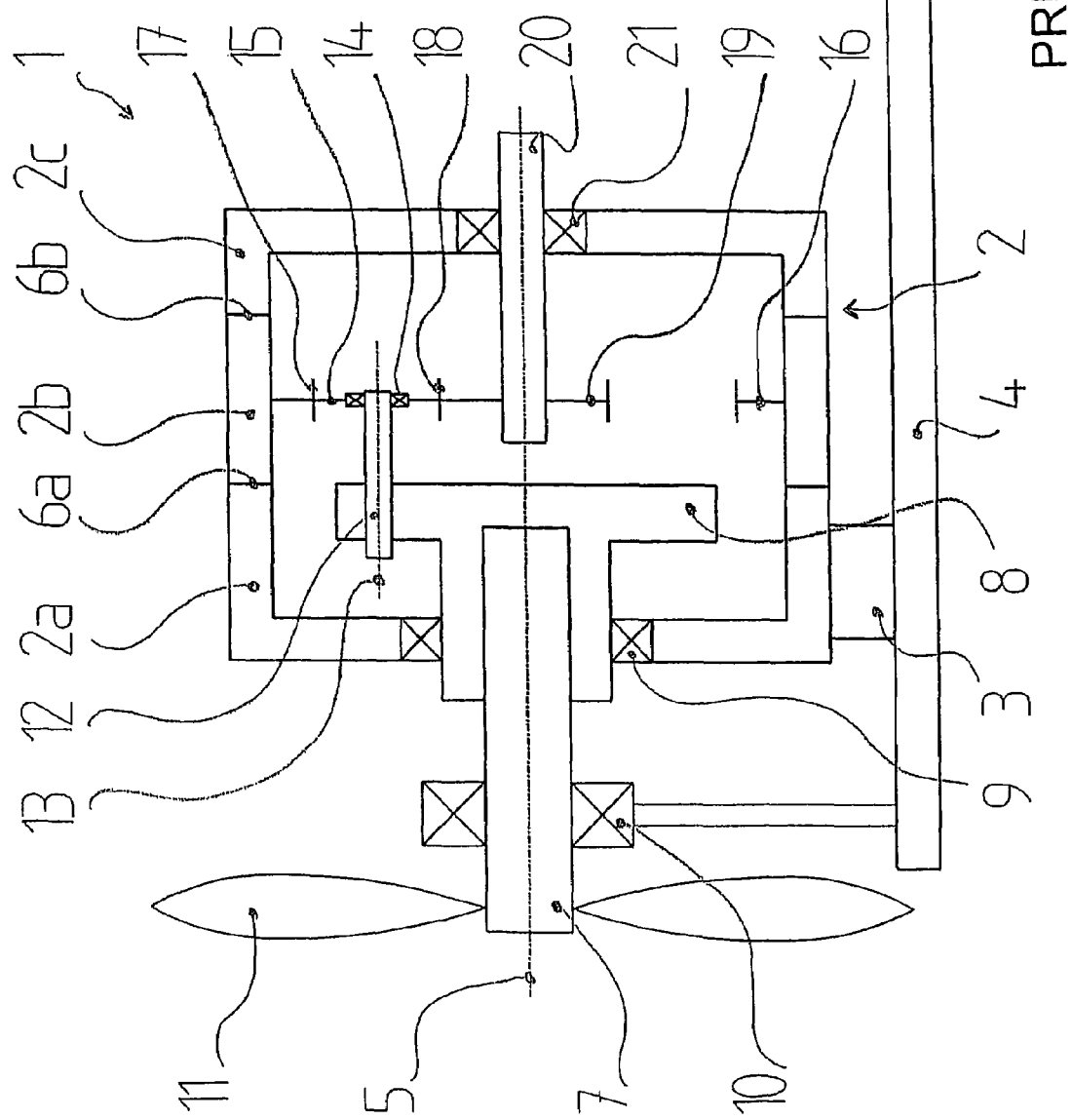

FIG. 1 shows the fundamental structure of an epicyclic gear mechanism 1 of the type stated initially, which can be used in a wind energy system. It is referred to below in short as gear mechanism 1. Gear mechanism 1 includes a housing 2 that is composed of three sections: a drive-side section 2a, a center section 2b, and a power take-off side section 2c. Drive section 2a is rigidly connected with a machine frame 4 by way of a housing bearing 3. The three sections 2a, 2b, 2c extend along a main axis 5 of gear mechanism 1 and abut two parting planes 6a, 6b oriented normal to main axis 5. The adjacent sections 2a, 2b, 2c, in each instance, are releasably screwed together with bolts, not shown, in parting planes 6a, 6b.

The drive of gear mechanism 1 takes place from a rotor shaft 7 to a pinion cage 8, which is mounted to rotate about main axis 5, by means of a pinion cage bearing 9 in drive side section 2a. Rotor shaft 7 in turn is mounted to rotate about main axis 5, in a rotor bearing 10, and is put into motion by the rotor 11 that stands in the wind. In addition, rotor 11 and rotor shaft 7 are indirectly mounted by way of the pinion cage bearing 9 and the housing bearing 3. In reality, two housing bearings 3 are present, which are disposed on both sides of main axis 5, opposite gear mechanism 1. Accordingly, one speaks of so-called three-point mounting of rotor 11.

Pinion cage 8 has at least one planet bolt 12 that extends along a planet axis 13 that runs parallel to main axis 5, and is fixed relative to the pinion cage. Planet bolt 12 is shrunk into pinion cage 8, and therefore remains unmoved relative to pinion cage 8 during normal operation. Planet bolt 12 can be mounted in pinion cage 8 in overhung manner, as shown, or also on both sides. A planet wheel 15 is mounted by a planet bearing 14 on planet bolt 12, coaxially to planet axis 13. Planet wheel 15 can have straight or slanted gear teeth. In reality, wind energy gear mechanisms have a plurality of planet wheels with bolts and bearings, in most cases three. For the sake of simplicity, only one planet wheel 15 plus planet bolt 12, planet axis 13, and planet bearing 14 are shown in the present drawings.

An integral part of center section 2b is an internal geared wheel 16; it is consequently fixed in the housing. Planet wheel 15 and internal geared wheel 16 mesh jointly in a first gear tooth engagement 17. When pinion cage 8 is driven, planet wheel 15 performs a planetary motion that results from the superimposition of a first rotational motion about planet axis 13, and a second rotational motion about main axis 5.

Planet wheel 15 meshes with a sun wheel 19 by way of a second gear tooth engagement. Sun wheel 19 is an integral part of a sun shaft 20, which is mounted to rotate in power take-off side section 2c, coaxially to main axis 5, by way of a sun bearing 21. Sun shaft 20 and sun wheel 19 can also be configured as separate components that are connected so as to rotate with one another. The planetary motion of planet wheel 15 is translated into a simple rotation motion of sun wheel 19 and sun shaft 20 about main axis 5.

Many wind energy gear mechanisms have a spur wheel stage with standing wheels that follows the epicyclic wheel stage. The drive of any spur wheel stage would take place by way of sun shaft 20. For the explanation and implementation of the method according to the invention, the spur wheel stage is unnecessary. For this reason, the spur wheel stage was not shown in the drawing, to give a better overview. Likewise, the drive train that follows gear mechanism 1 is also not shown; it extends to the generator, also not shown.

Figure 2A:
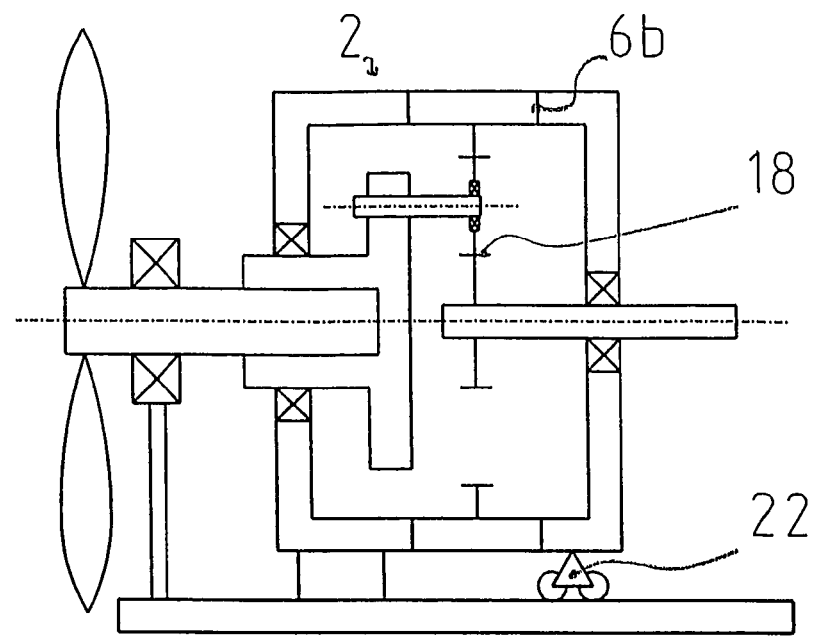

The fundamental sequence of the method according to the invention will now be explained using FIGS. 2a to 2m. First, a linear guide 22 is installed between power take-off side section 2c and machine frame 4; this linear guide makes it possible to displace power take-off side section 2c along main axis 5 (FIG. 2a). In practice, a type of "roller skate" is suitable for configuring linear guide 22, which is attached to power take-off side section 2c of housing 2 and rolls along the top of machine frame 4. Such a linear guide can be produced inexpensively, and is easy to transport up to the gondola.

Figure 2B:
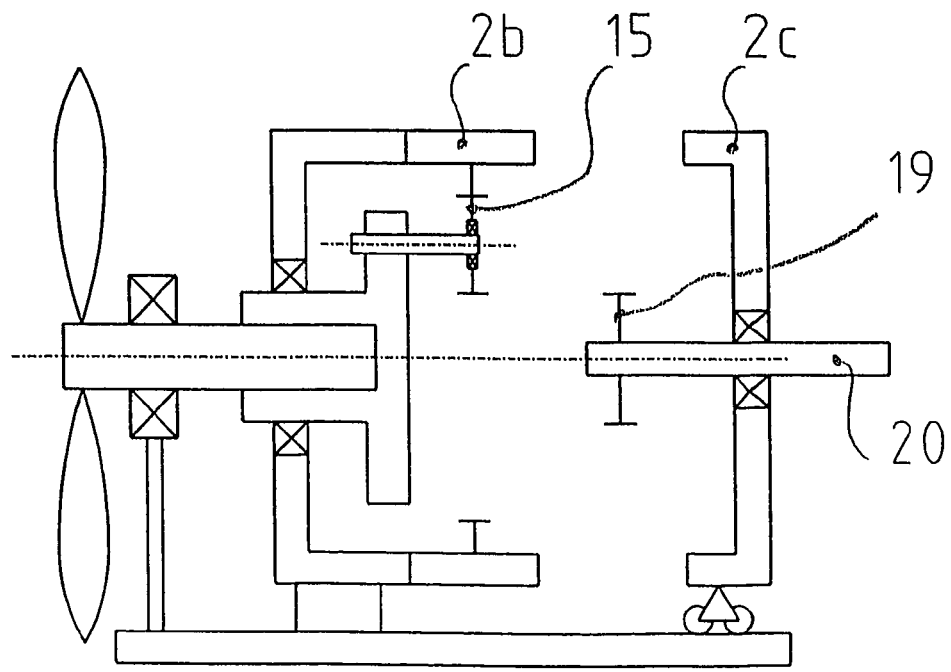

After linear guide 22 has been installed, housing 2 is divided up in parting plane 6b between center section 2b and power take-off side section 2c, by releasing the bolts, not shown, and moved apart along main axis 5 via linear guide 22 (FIG. 2b). Second gear tooth engagement 18 between planet wheel 15 and sun wheel 19 is thereby released. Sun wheel 19 is now removed from the housing, with or without sun shaft 20 (FIG. 2c).

Now first gear tooth engagement 17 between planet wheel 15 and internal geared wheel 16 must be released. For this purpose, planet wheel 15 is supposed to be displaced parallel to planet axis 13 (FIG. 2d). The parallel displacement of planet wheel 15 relative to planet axis 13 can be implemented, in practice, by means of oblong hole planet bushings, by means of a one-piece eccentric bolt 27 shown in FIGS. 2c to 2k, or by means of a two-part installation bolt 32 shown in FIGS. 3 and 4.

Oblong hole planet bushings run radially to main axis 5, through pinion cage 8, and accommodate cylindrical planet bolts 12. Cylindrical planet bolt 12 is positioned in the oblong hole planet bushing by means of suitable clamping elements. Such a constellation is known from GB 267 733 A.

Figure 2C:
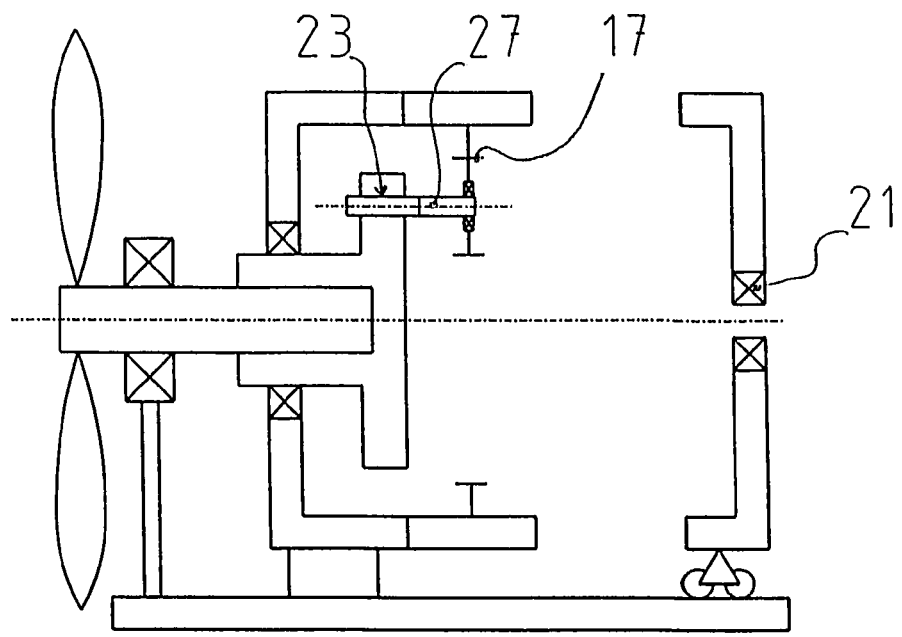
Figure 2D:
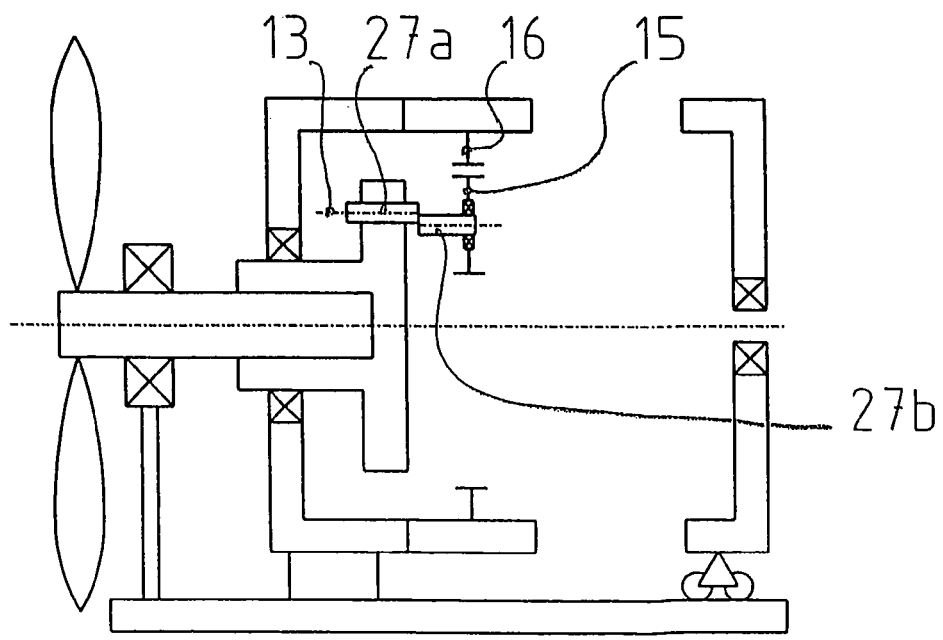

Alternatively, an eccentric bolt 27 can be inserted into a cylindrical planet bushing 23 (FIG. 2c). Eccentric bolt 27 includes at least two segments 27a, 27b. These segments are offset parallel to one another. The first cylindrical segment 27a is inserted into cylindrical planet bushing 23, and on second segment 27b, planet wheel 15 is mounted. By turning first segment 27a about planet axis 13, second segment 27b can be displaced from an aligned position (FIG. 2c) into an eccentric position (FIG. 2d). Eccentric bolt 27 is either delivered with gear mechanism 1, from the plant, or inserted into pinion cage 8 only temporarily, in place of a cylindrical planet bolt 12, for the planet replacement procedure. A suitable eccentric bolt is disclosed, for example, in DE 37 11 405 C2.

Figure 2E:
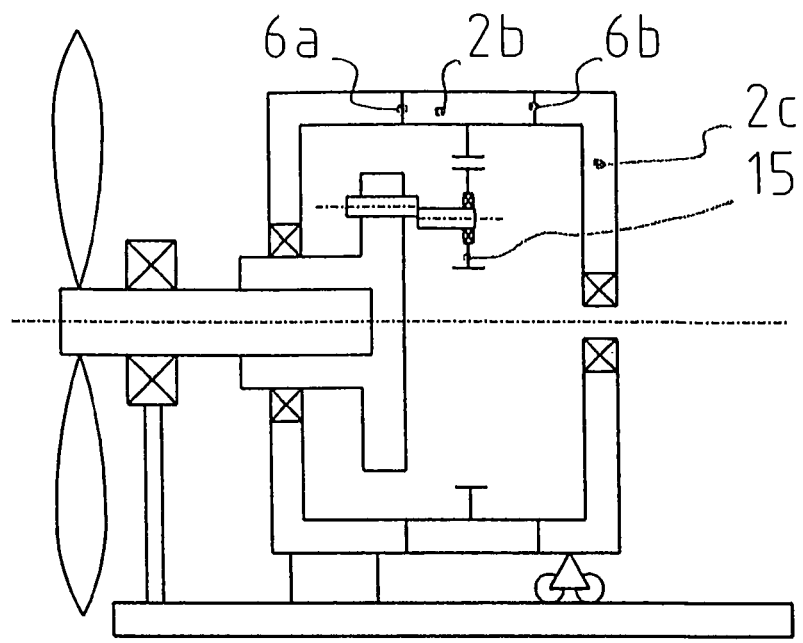

After the parallel displacement of planet wheel 15, housing 2 is closed again by means of joining together center section 2b and power take-off side section 2c (FIG. 2e). From FIG. 2e, it is evident why sun wheel 19 and, respectively, also sun shaft 20, were previously removed (in FIG. 2c): When joining together center section 2b and power take-off side section 2c, the sun wheel would collide with planet wheel 15 that is partially displaced.

Figure 2F:
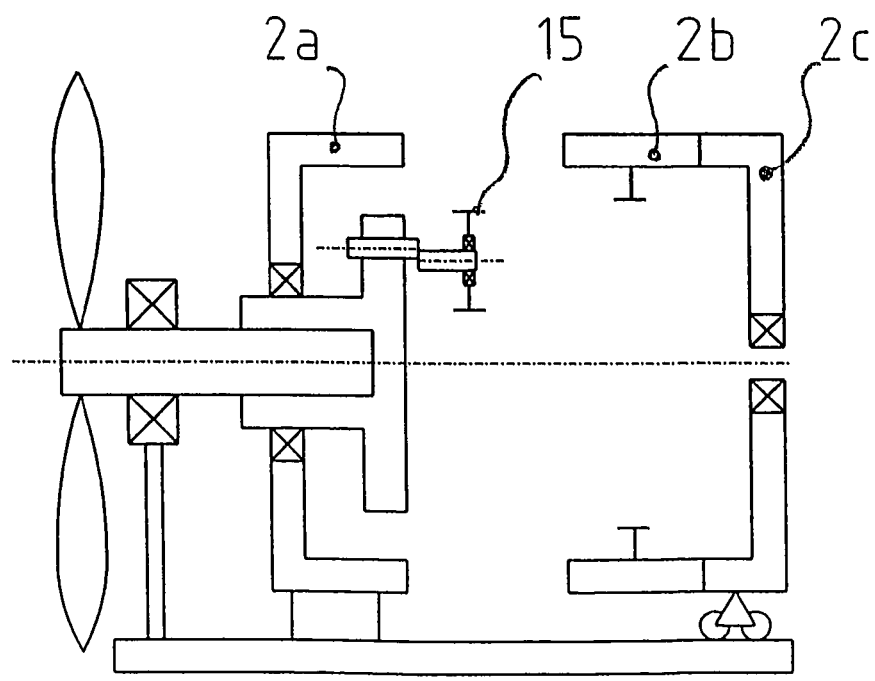

After parting plane 6b is screwed closed, housing 2 can be opened in parting plane 6a. Center section 2b can now be moved away from drive-side section 2a which is connected with machine frame 4 via housing bearing 3, together with power-take off side section 2c (FIG. 2f).

Figure 2G:
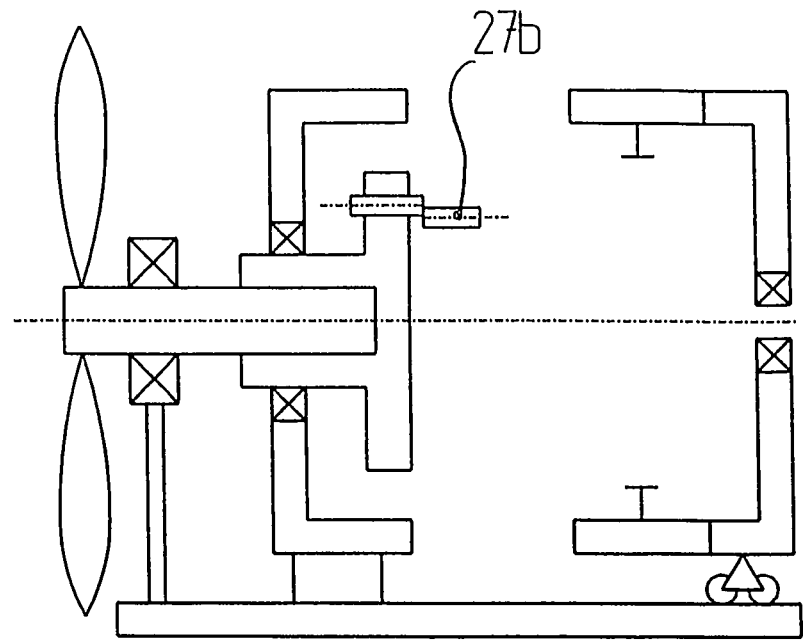
Figure 2H:
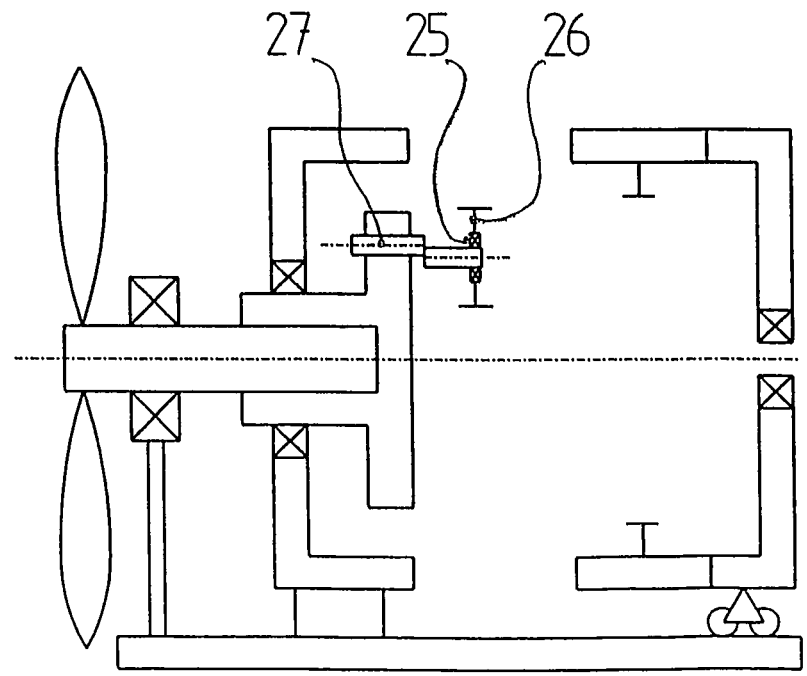
Figure 2I:
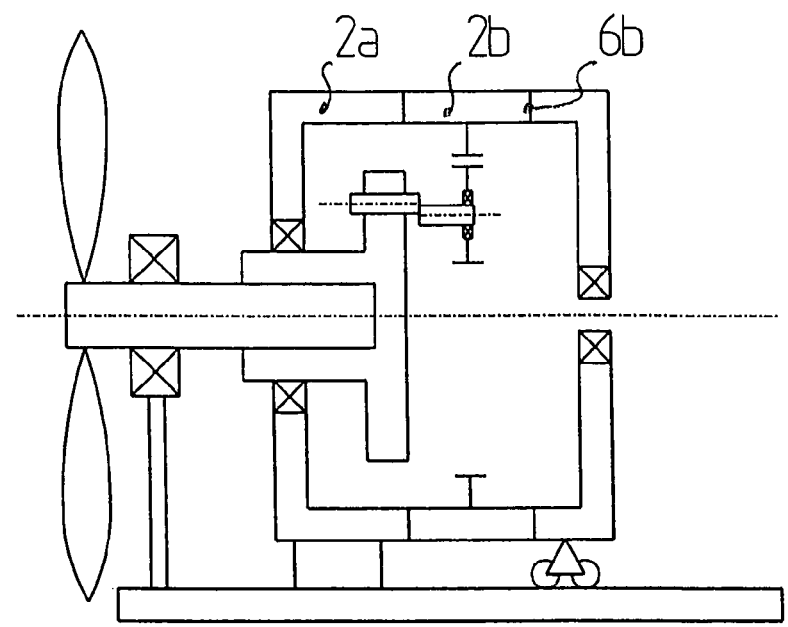
Figure 2J:
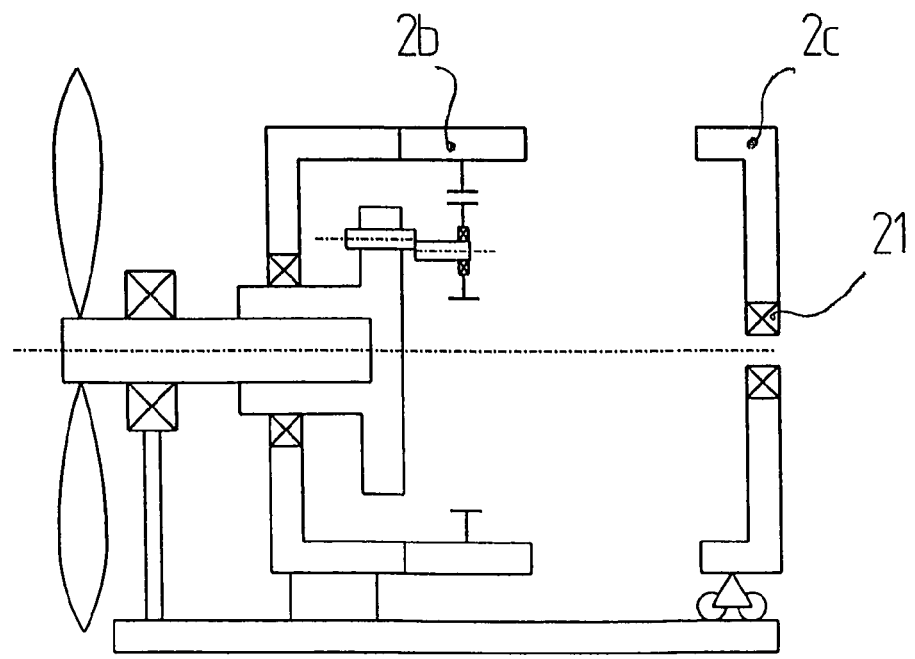
Figure 2K:
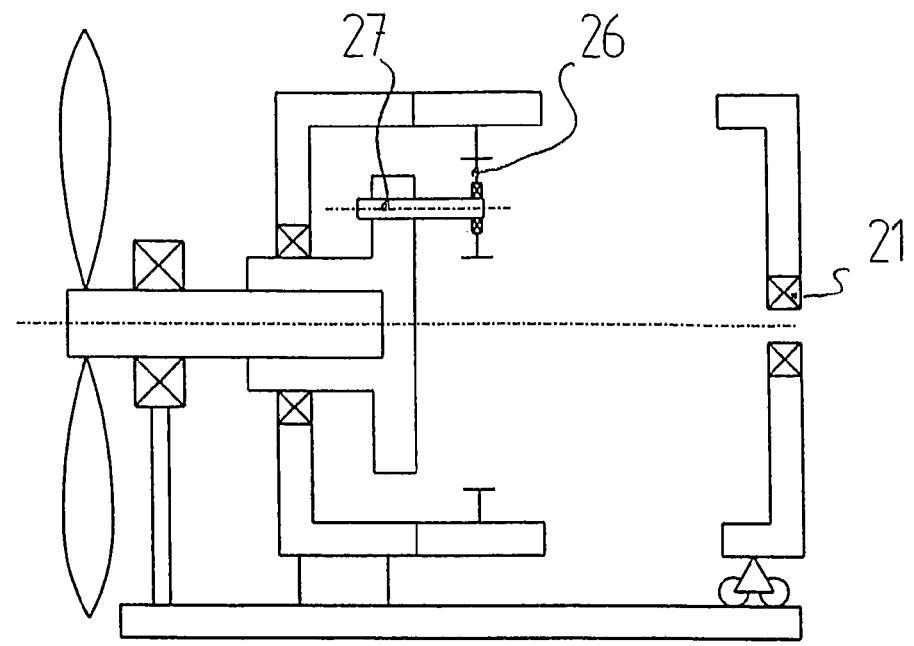

Planet wheel 15 is now easily accessible and can be removed from the second segment of eccentric bolt 27b (FIG. 2g). Subsequently, a replacement planet wheel 26, together with a replacement planet bearing 25, is set onto the eccentric bolt 27 (FIG. 2h).

Since housing 2 is open very wide in the region of planet wheel 15 (FIGS. 2f to 2h), the working space is easily accessible for the installers. Also, heavy planet wheels 15, 26 can be vertically inserted and removed, using the on-board crane, since housing 2 is open above the position of planet wheel 15.

Figure 2L:
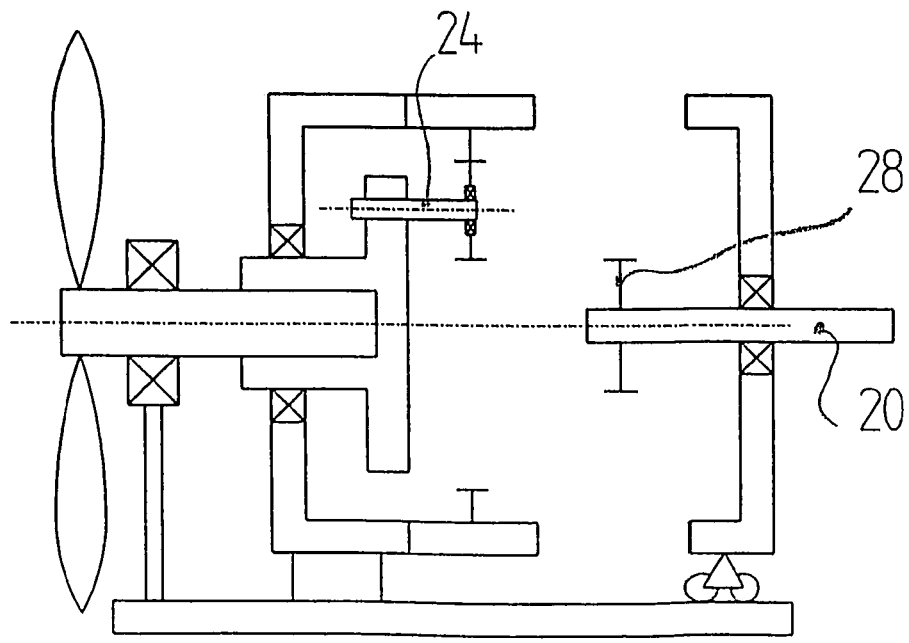
Figure 2M:
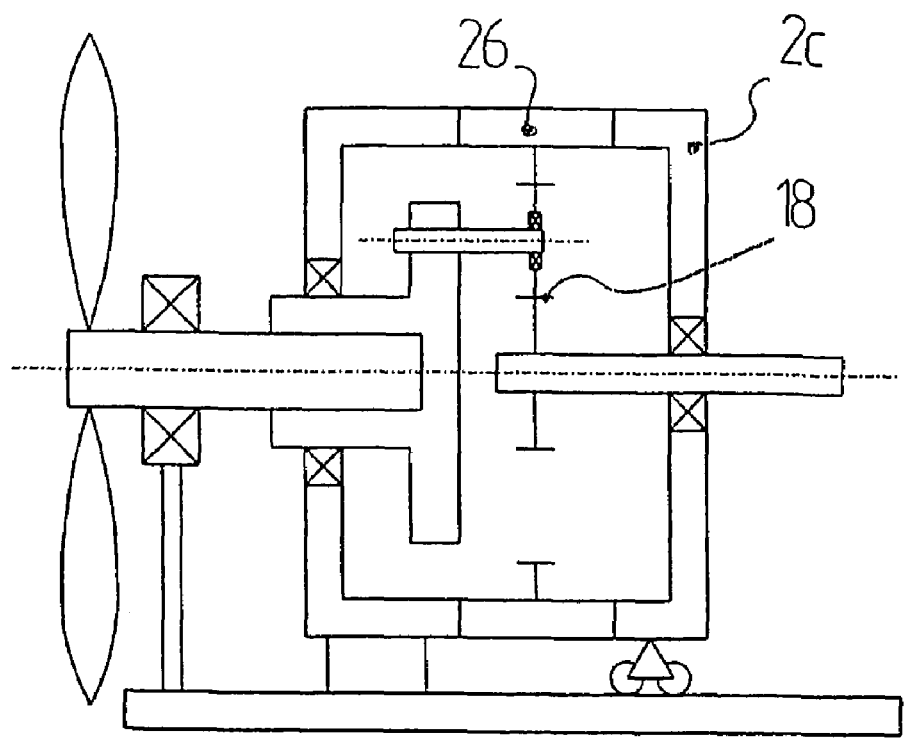

Gear mechanism 1 is closed in the reverse sequence, see FIGS. 2i to 2m. If necessary, eccentric bolt 27 is replaced with a replacement planet bolt 24, and sun wheel 19 is replaced with a corresponding replacement sun wheel 28, in the meantime (FIG. 2l). At this opportunity, sun wheel 20, sun bearing 21, or even the entire spur wheel stage, not shown here, can be replaced, as well.

Figure 3A:
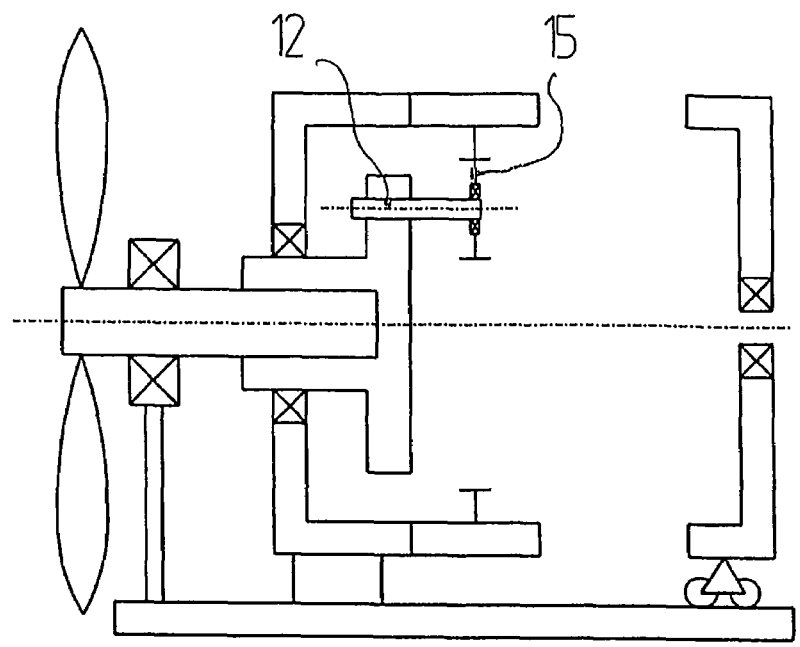
Figure 3B:
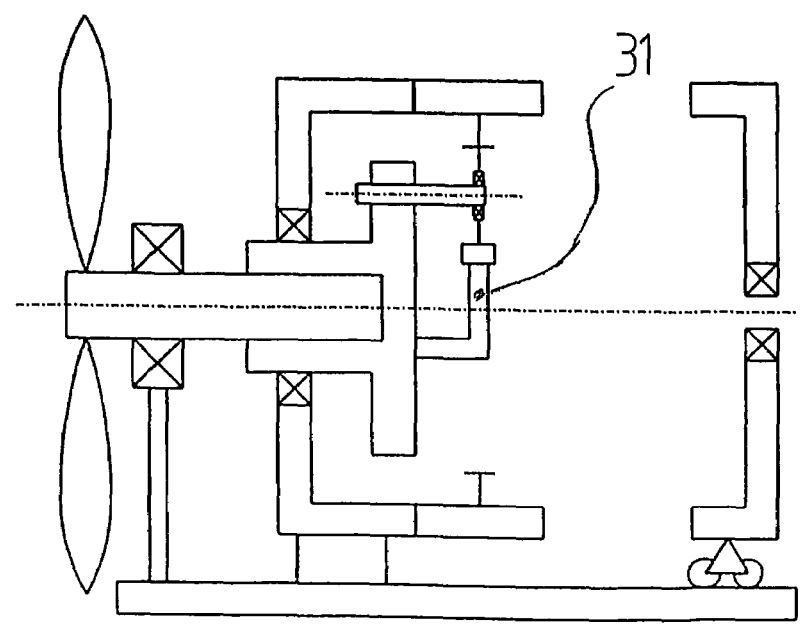
Figure 3C:
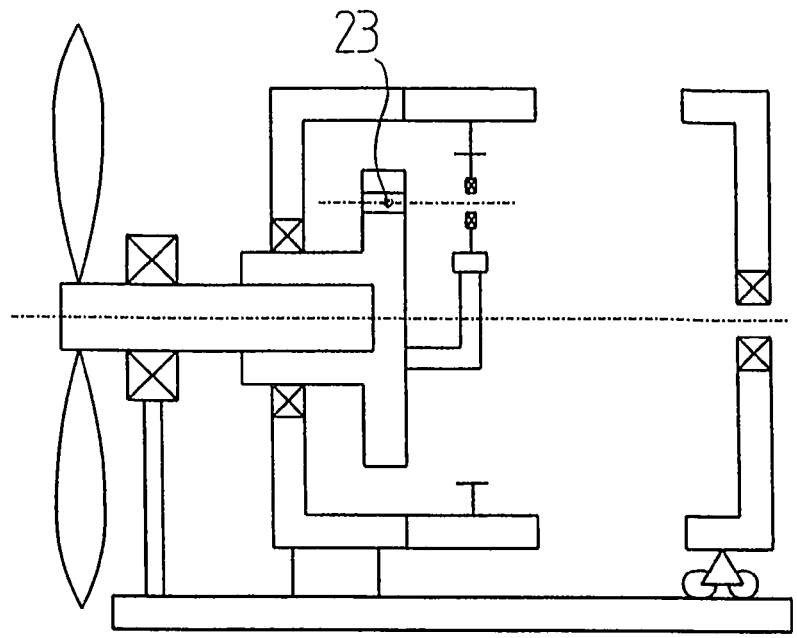
Figure 3D:
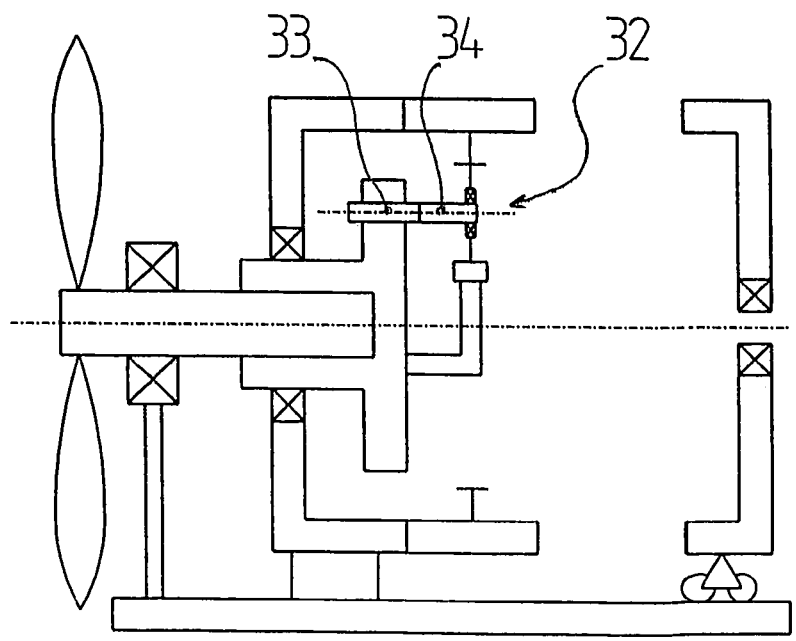
Figure 3E:
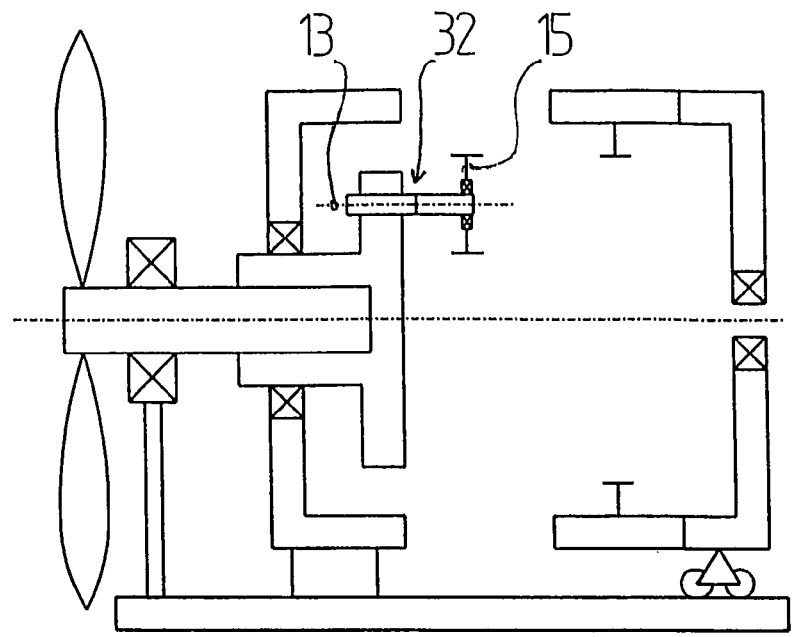
Figure 3F:
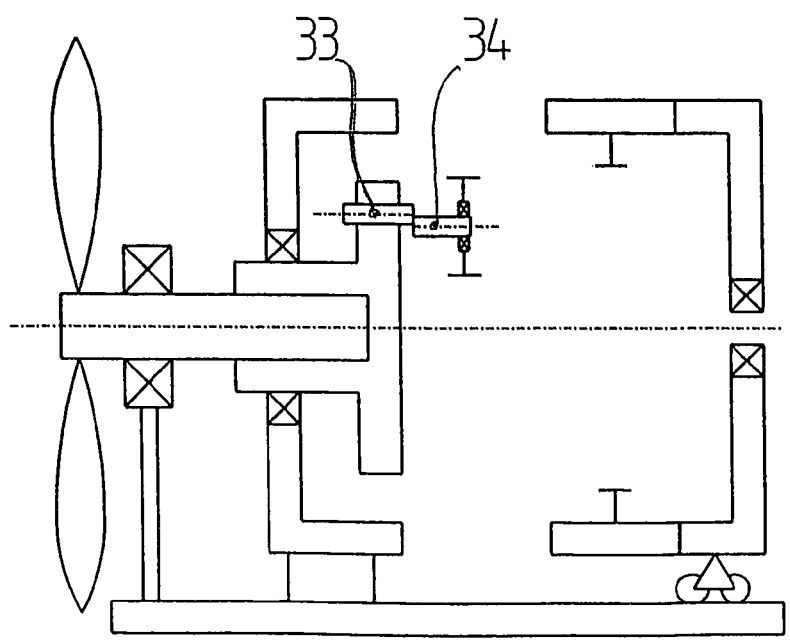

In FIGS. 3a to 3j, implementation of the method is illustrated using a special, two-part installation bolt 32. After second parting plane 6b is opened and sun wheel 19 is removed (FIG. 3a), planet wheel 15 is supported relative to pinion cage 8 with a support 31 (FIG. 3b). Then, planet bolt 12 is removed (FIG. 3c), and replaced with an installation bolt 32 (FIG. 3d).

Figure 3G:
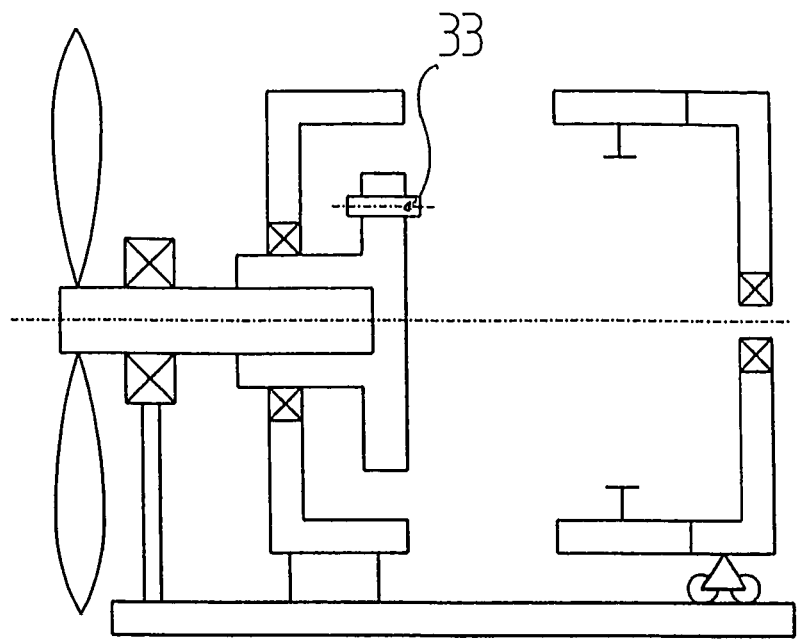
Figure 3H:
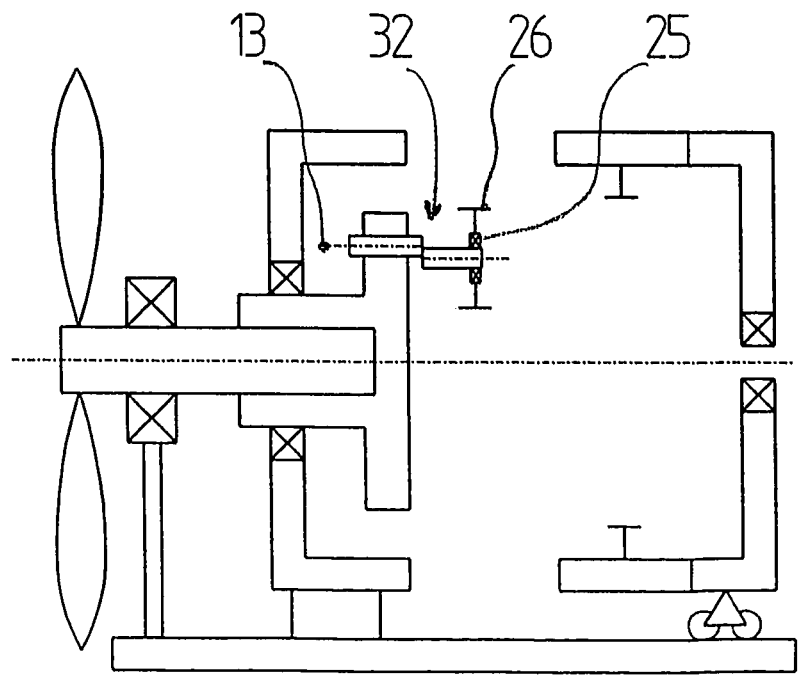
Figure 3I:
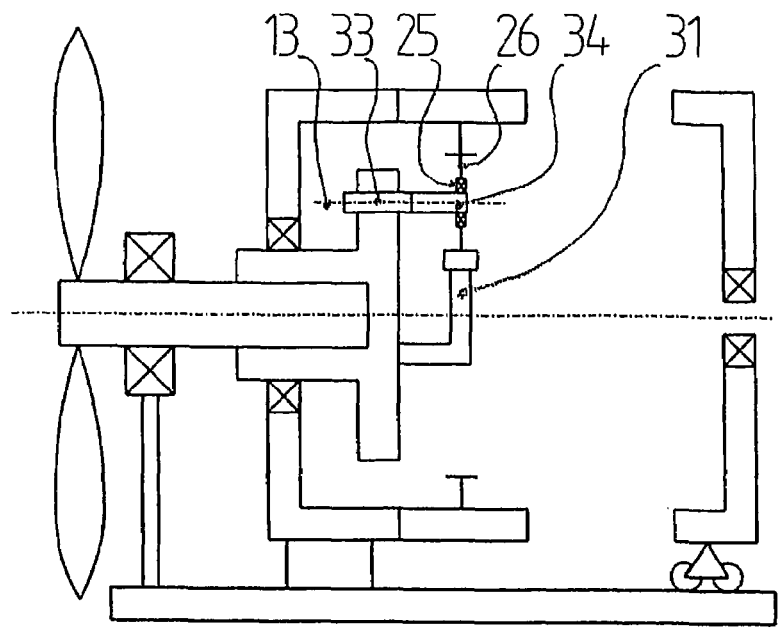

Installation bolt 32 includes a cheek piece 33 assigned to pinion cage 8, and a bearing piece 34 assigned to planet wheel 15. Cheek piece 33 can be inserted into pinion cage 8; planet wheel 15 is mounted on bearing piece 34 with its planet bearing 14. Installation bolt 32 optionally makes it possible to displace bearing piece 34 parallel relative to cheek piece 33, or to dispose these two segments 33, 34 coaxially to one another, so that planet wheel 15 can be positioned optionally coaxial or with a parallel offset to planet axis 13. Furthermore, installation bolt 32 can be divided, so that planet wheel 15 together with bearing piece 34 can be removed from pinion cage 8 in the radial direction to main axis 5, while cheek piece 33 remains inserted in pinion cage 8 (FIG. 3g). A suitable installation bolt is described in greater detail below.

Figure 3J:
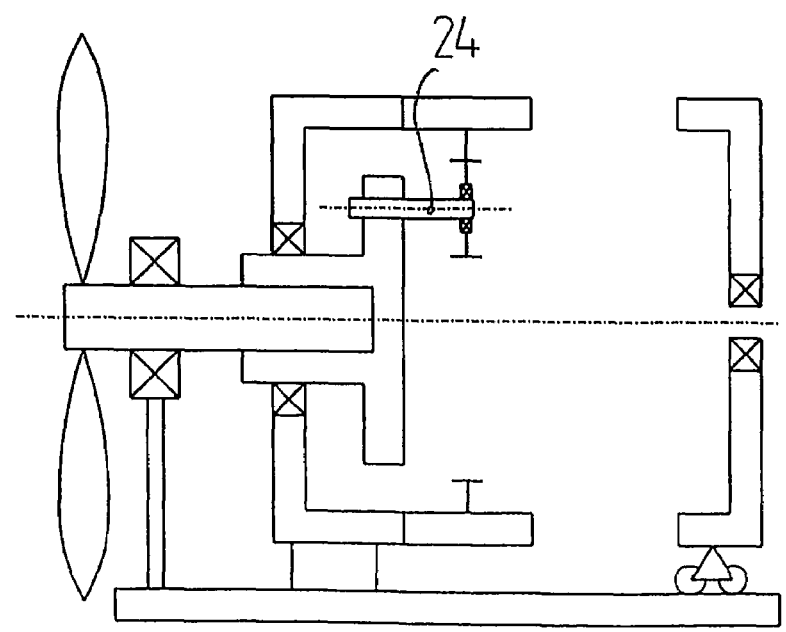

When removing planet wheel 15 together with bearing piece 34 (FIG. 3g), center section 2b of housing 2 is attached to power take-off side section 2c. In this way, vertical transport of the components, using a crane, is easily possible. Gear mechanism 1 is closed in the reverse sequence; installation bolt 32 is replaced with a replacement planet bolt 24, as shown in FIG. 3j.

The method according to the invention was described using the example of an epicyclic gear mechanism 1 of a wind energy system. It can advantageously be used also for other gear mechanisms that are accessible only with difficulty.

Figure 4A:
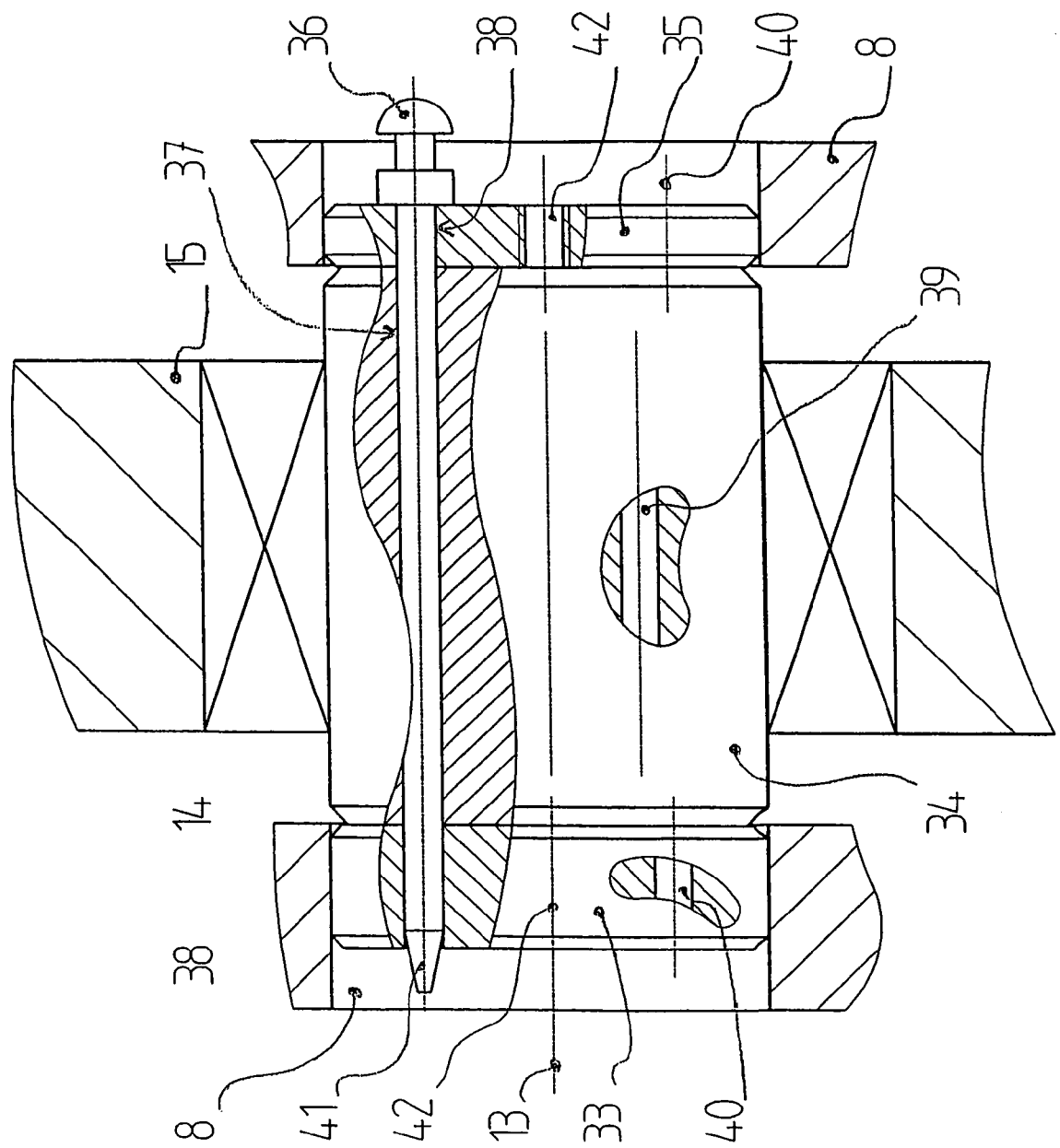

FIGS. 4a and 4b show an installation bolt 32 that can be used for implementing the method according to the invention and for other installation work on gear mechanisms. Installation bolt 32 is used in place of a conventional planet bolt 12. It consists of three separate segments, namely a first cheek piece 33, a bearing piece 34, and a second cheek piece 35, shown only in FIGS. 4a-4c. Pieces 33, 34, 35 are cylindrical bodies having a common diameter. The two cheek pieces 33, 35 enclose bearing piece 34 on both sides.

Cheek pieces 33, 35 are intended to be inserted into a gear mechanism element, such as into a pinion cage 8, for example; a planet bearing 14 with a planet wheel 15 finds room on bearing piece 34.

Installation bolt 32 can be installed in two different positions. One position is an aligned position shown in FIG. 4a. The other position is an eccentric position shown in FIG. 4b. The position of installation bolt 32 is determined using a pin 36, in that the pin is inserted into different bores.

Bearing piece 34 is provided with a bearing alignment bore 37, which extends axially through bearing piece 34. Cheek alignment bores 38 are made in both cheek pieces 33, 35, which align with bearing alignment bore 37 if the three partial pieces 33, 34, 35 of installation bolt 32 are disposed concentric to one another. This arrangement, shown in FIG. 4a, is achieved in that pin 36 is inserted through the alignment bores 37, 38.

Installation bolt 32 makes it possible to displace bearing piece 34 in the radial direction, parallel to cheek pieces 33, 35 see FIG. 4b in this regard. For this purpose, bearing piece 34 is provided with a bearing eccentric bore 39, and cheek pieces 33, 35 are each provided with a cheek eccentric bore 40. Eccentric bores 39, 40 align when bearing piece 34 is offset parallel. In order to achieve this state, pin 36 is introduced into one cheek eccentric bore 40 and pushed through the bearing eccentric bore 39 until pin 36 also enters into the other cheek eccentric bore 40.

When threading pin 36 in, a wedge surface 41 that is disposed on the end of pin 36 and offsets cheek piece 33 parallel during insertion provides assistance.

When pin 36 has been completely removed from installation bolt 32, bearing piece 34, together with planet bearing 14 and planet wheel 15 disposed on it, can be removed from pinion cage 8 in the radial direction (FIG. 4c). Cheek pieces 33, 35 remain in pinion cage 8 in the meantime. For simpler handling of the components, partial pieces 33 to 35 of installation bolt 32 are provided with a threaded bore 42 at one face, in each instance, into which an eye screw, not shown, can be screwed. Using the eye screw, the components of the installation bolt 32 can be moved without problems, and inserted into planet bushing 23.

If only a single pin 36 having a circular cross-section is used, there is the disadvantageous possibility that bearing piece 34 can turn about pin 36. In order to counteract this possibility, two pins 36 can be provided, thereby doubling the number of bores 37, 38, 39, 40 in components of installation bolt 32 accordingly.

Although at least one embodiment has been shown and described, it is to be understood that many changes and modifications may be made thereunto without departing from the spirit and scope of the invention as defined in the appended claims.

What is claimed is:

1. A method for replacing components of an epicyclic gear mechanism, the epicyclic gear mechanism comprising:
   aa) a main axis;
   ab) a housing divided by at least two parting planes into at least three housing sections aligned along a main axis, the housing sections comprising a drive side section, a center section, and a power take-off side section, the housing being separatable in the parting planes;
   ac) a pinion cage mounted to rotate in the drive side section about the main axis and comprising at least one planet bolt extending along a planet axis fixed relative to the pinion cage and running parallel to the main axis;
   ad) an internal geared wheel fixed to the housing and disposed in the center section coaxially to the main axis;
   ae) a sun wheel mounted to rotate on the power take-off side section;
   af) at least one planet wheel mounted to rotate on the planet bolt and meshing with the internal geared wheel in a first gear tooth engagement and with the sun wheel in a second gear tooth engagement;
   ag) wherein the drive side section is mounted in a machine frame;
said method comprising the following steps:
   ba) separating the housing in the parting plane between the center section and the power take-off side section;
   bb) moving apart the center section and the power take-off side section so that the second gear tooth engagement between the planet wheel and the sun wheel is released;
   bc) removing the sun wheel from the housing;
   bd) displacing the planet wheel so that the first gear tooth engagement between the planet wheel and the internal geared wheel is released;
   be) joining the center section and the power take-off side section together;
   bf) separating the housing in the parting plane between the drive side section and the center section;
   bg) moving apart the drive side section and the center section;
   bh) removing the planet wheel;
   bi) inserting a replacement planet wheel, offset parallel to the planet axis;
   bj) joining the drive side section and the center section together;
   bk) separating the housing in the parting plane between the power take-off side section and the center section;
   bl) moving apart the power take-off side section and the center section;
   bm) restoring the first gear tooth engagement between the internal geared wheel and the replacement planet wheel by displacing the replacement planet wheel coaxially to the planet axis;
   bn) inserting a replacement sun wheel in the housing; and
   bo) joining the center section and the power take-off side section together so that the second gear tooth engagement between the replacement planet wheel and the replacement sun wheel is restored.

2. The method according to claim 1, wherein a linear guide is affixed between the power take-off side section and the machine frame, the linear guide extending parallel to the main axis, the power take-off side section being movable via the linear guide along the main axis relative to the machine frame when the housing is divided.

3. A method for replacing components of an epicyclic gear mechanism, the epicyclic gear mechanism comprising:
   aa) a main axis;
   ab) a housing divided by at least two parting planes into at least three housing sections aligned along a main axis, the housing sections comprising a drive side section, a center section, and a power take-off side section, the housing being separatable in the parting planes;
   ac) a pinion cage mounted to rotate in the drive side section about the main axis and comprising at least one installation bolt extending along a planet axis fixed relative to the pinion cage and running parallel to the main axis;
   ad) an internal geared wheel fixed to the housing and disposed in the center section coaxially to the main axis;
   ae) a sun wheel mounted to rotate on the power take-off side section;
   af) at least one planet wheel mounted to rotate on the installation bolt and meshing with the internal geared wheel in a first gear tooth engagement and with the sun wheel in a second gear tooth engagement;
   ag) wherein the drive side section is mounted in a machine frame; and
   ah) wherein the installation bolt comprises a bearing piece associated with the planet wheel for mounting the planet wheel, at least one cheek piece associated with the pinion cage and fixable in place on the pinion cage, and at least one pin, the bearing piece being a separate component from the cheek piece, the cheek piece having at least one axial cheek alignment bore and at least one axial cheek eccentric bore, the bearing piece having at least one axial bearing alignment bore and at least one axial bearing eccentric bore; and the at least one pin being insertable through the at least one axial bearing alignment bore, the at least one axial cheek alignment bore, the at least one axial bearing eccentric bore, and the at least one axial cheek eccentric bore.
said method comprising the following steps:
   ba) separating the housing in the parting plane between the center section and the power take-off side section;
   bb) moving apart the center section and the power take-off side section so that the second gear tooth engagement between the planet wheel and the sun wheel is released;
   bc) removing the sun wheel from the housing;
   bd) displacing the planet wheel so that the first gear tooth engagement between the planet wheel and the internal geared wheel is released;
   be) joining the center section and the power take-off side section together;
   bf) separating the housing in the parting plane between the drive side section and the center section;
   bg) moving apart the drive side section and the center section;

bh) removing the planet wheel;

bi) inserting a replacement planet wheel, offset parallel to the planet axis;

bj) joining the drive side section and the center section together;

bk) separating the housing in the parting plane between the power take-off side section and the center section;

bl) moving apart the power take-off side section and the center section;

bm) restoring the first gear tooth engagement between the internal geared wheel and the replacement planet wheel by displacing the replacement planet wheel coaxially to the planet axis;

bn) inserting a replacement sun wheel in the housing; and bo) joining the center section and the power take-off side section together so that the second gear tooth engagement between the replacement planet wheel and the replacement sun wheel is restored.

* * * * *

UNITED STATES PATENT AND TRADEMARK OFFICE
CERTIFICATE OF CORRECTION

PATENT NO. : 7,644,482 B2　　　　　　　　　　　　　　　　　　　　　　　　Page 1 of 1
APPLICATION NO. : 11/322191
DATED : January 12, 2010
INVENTOR(S) : Albers et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1049 days.

Signed and Sealed this

Sixteenth Day of November, 2010

David J. Kappos
*Director of the United States Patent and Trademark Office*